United States Patent [19]

Lemirande

[11] Patent Number: 4,855,653
[45] Date of Patent: Aug. 8, 1989

[54] OBSTRUCTION DETECTION IN AUTOMATIC PORTAL CONTROL APPARATUS EMPLOYING INDUCTION MOTOR POWER FACTOR

[75] Inventor: Rodger P. Lemirande, Macomb Township, Mich.

[73] Assignee: Stanley Automatic Openers, Detroit, Mich.

[21] Appl. No.: 163,862

[22] Filed: Mar. 3, 1988

[51] Int. Cl.⁴ ............................................. H02P 3/18
[52] U.S. Cl. .................... 318/282; 318/729; 318/469; 49/28
[58] Field of Search ............... 318/726, 469, 282, 266, 318/798, 806; 49/28

[56] References Cited

U.S. PATENT DOCUMENTS

| 3,600,657 | 8/1971 | Pfaff | 318/314 |
| 4,335,339 | 6/1982 | Brickner | 318/469 |
| 4,394,607 | 7/1983 | Lemirande | 318/469 |
| 4,454,462 | 6/1984 | Spann | 318/729 |
| 4,710,692 | 12/1987 | Libert et al. | 318/729 |

FOREIGN PATENT DOCUMENTS

2128425  4/1984  United Kingdom ............... 318/729

Primary Examiner—David Smith, Jr.
Attorney, Agent, or Firm—Krass & Young

[57] ABSTRACT

The present invention is a load sensor for use in an automatic portal operator such as an industrial gate operator. An induction motor is employed to move the gate. The power factor of the AC electric power supplied to the induction motor is monitored. A safety operation is triggered when the power factor indicates the motor load is greater than a predetermined amount, as when an obstruction is encountered by the gate.

11 Claims, 3 Drawing Sheets

OBSTRUCTION DETECTION IN AUTOMATIC PORTAL CONTROL APPARATUS EMPLOYING INDUCTION MOTOR POWER FACTOR

FIELD OF THE INVENTION

The field of the present invention is that of obstruction detection devices in automatic portal operators, and in particular devices which sense a change in operating characteristic of the drive motor.

BACKGROUND OF THE INVENTION

It is heretofore been known to employ electric motors to open and close portal closing members. The most recognizable example of such portal operators are electric garage door openers. However, the same technique is employed in other apparatuses such as toll gates, railroad crossing gates, and operators for large industrial gates. The common feature in all of these is the use of an electric motor to open and close the portal closing member. This electrical motor is used either for convenience, as in the case of electric garage door openers, or for supplying the relatively great motive power required, as in the case of large industrial gates not suitable for manual operation.

The use of such automatic portal operators introduces a potential safety hazard. Such automatic portal operators do not have the capability of recognizing an obstruction or other hazardous condition as is the case when such a portal was operated by a person. There have been various techniques employed in order to attempt to detect obstructions of the automatic portal operator and to initiate some safety function to reduce or eliminate the hazardous operation. The most common form of safety device is a strip at the leading edge of the portal member, which strip includes a switch which is operated when it strikes an object. Thus, striking an object causes the switch to actuate and enables the controller for the automatic portal operator to initiate a safety operation.

Another technique known in the art is that of U.S. Pat. No. 4,335,339 entitled "Electronic Safety Device" issued to Joseph L. Brickner on June 15, 1982. In accordance with this patent, the amount of current drawn by the electric motor of the automatic portal operator is measured. A sudden increase in the current drawn by the motor, which is indicative of a sudden increase in the motor load, enables triggering of the safety function.

In accordance with the prior art it is heretofore been known to provide one of three types of safety operations. The first type of safety operation is to stop the motor and thereby stop the portal from opening or closing. Another type of safety operation is to reverse the operation of the portal operator and return to the limit opposite that which the portal was being driven. A third, more sophisticated technique, is to stop the portal operator, drive the portal in the reverse direction for a predetermined amount, and then again stop. Each of these three techniques may be advantageously employed for enhancing the safety of the operation of the portal operator, depending upon the nature of the portal and the potential hazards.

The above described safety techniques have limited capability in recognizing hazardous conditions. In the case of a safety strip at the leading edge of the portal, this responds only when the portal is traveling in the closing direction. It is likely that an obstruction be encountered on the trailing edge or on the middle of the portal. Therefore, even in the case of the portal operator closing, it is possible to create a hazardous condition at portions of the portal other than the leading edge where the safety strip is located. In such a case the safety strip would not detect the hazardous condition.

In the case of the sensing of the current of the drive motor, the current is not necessarily indicative of a overload condition of the motor. Firstly, the current may vary widely during normal operation of the motor without the presence of obstructions. In order to achieve a sufficiently low number of false alarms in such a case, the current must be set higher than the highest expected current during any normal operation. In addition, it is possible to get abnormally high current under adverse conditions of electric supply voltage, such as during a brown out in which the voltage is substantially reduced. This leads to false positive operation of the safety function. In addition, it is also possible to get false negative operations in which unusual power supply conditions are coupled with the occurrence of an obstruction or blockage of the portal during operation. Therefore, these techniques cannot be regarded as reliably detecting obstructions in the operation of the automatic portal operator apparatus.

Accordingly it has been a need in the art to provide some method of easily and reliably detecting an unsafe operation of an automatic portal operator, in particular the case in which the automatic portal operator encounters an unexpected obstruction.

SUMMARY OF THE INVENTION

It is therefore an object of the present invention to provide detection of excessive loading of the motor of an automatic portal operator, such as caused when the portal is obstructed, by measuring of the power factor of the electricity supplied to the motor. In accordance with the present invention the motor used in the automatic portal operator is an induction motor. The voltage and current supplied to this induction motor is sensed and employed to detect the abnormal operation of this motor. During the time in which the induction motor is lightly loaded, such as during normal operation, the power factor of the electricity supplied to the motor is relatively inductive. This means that there is a relatively substantial phase difference between the voltage and current supplied to the motor. During periods of higher loading of the motor, such as when an obstruction is encountered, the power factor becomes more resistive. This means that the phase difference between the voltage and current supplied to the motor decreases. In accordance with the present invention the decrease of the phase difference between the voltage and current supplied to the induction motor below a predetermined level is employed to initiate a safety operation of the automatic portal operator.

In accordance with the preferred embodiment of the present invention a power factor sensor apparatus is employed to detect this abnormal condition of the power factor of the induction motor. This power factor sensor includes an AC input corresponding to the AC voltage supply. This power factor sensor also includes an input of a toroidal magnetic sensor through which one lead of the two leads supplying electric power to the motor is inserted. This toroidal coil generates a signal corresponding to the current flowing through the particular wire. This current signal is also supplied to the power factor sensor. In accordance with the preferred embodiment of the present invention the phase of these two signals is compared. The safety function is triggered when this phase becomes less than a predetermined amount.

In accordance with the preferred embodiment of the present invention several additional features are incorporated. Firstly, a phase switch is employed to enable the power factor sensor to adjust for either direction of insertion of the motor lead through the toroidal coil. In addition, a reverse indication coming from a motor controller is employed to accommodate the power factor sensor to the reversal of the induction motor, such as when the induction motor is employed to drive the portal operator in the opposite direction.

BRIEF DESCRIPTION OF THE DRAWINGS

This and other objects and aspects of the present invention will become clear from a study of the following description taken in conjunction with the drawings in which.

DETAILED DESCRIPTION OF THE PREFERRED EMBODIMENT

Figure 1:
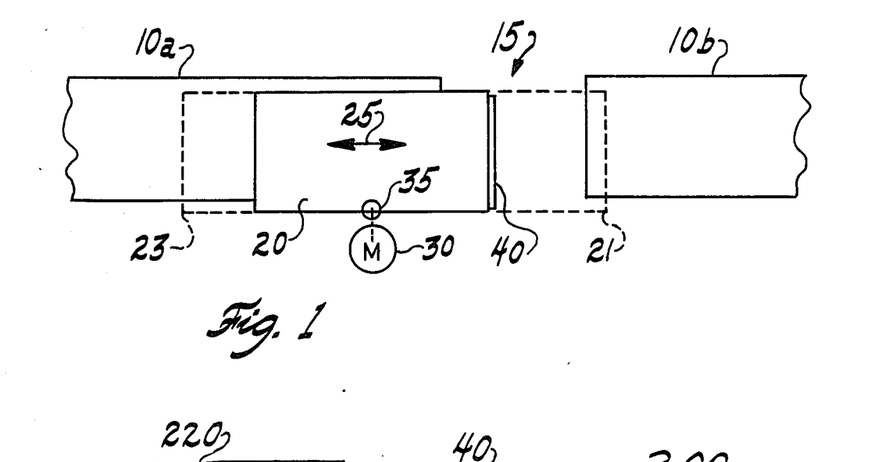
FIG. 1 illustrates the typical operation of an industrial gate closer such is applicable for the present invention.

FIG. 1 illustrates the parameters in an industrial gate operator such as could advantageously employ the present invention. FIG. 1 illustrates a fence shown in fence parts 10a and 10b having a portal 15 therebetween. A gate 20 is movable along directions 25 between a fully closed position illustrated in phantom at 21 and a fully open position illustrated in phantom at 23. Motor 30 with drive means 35 is employed to drive the gate 20 in the directions 25. Gate 20 also includes a safety strip 40 at the leading edge of the gate which is employed in the manner described above.

Figure 2:
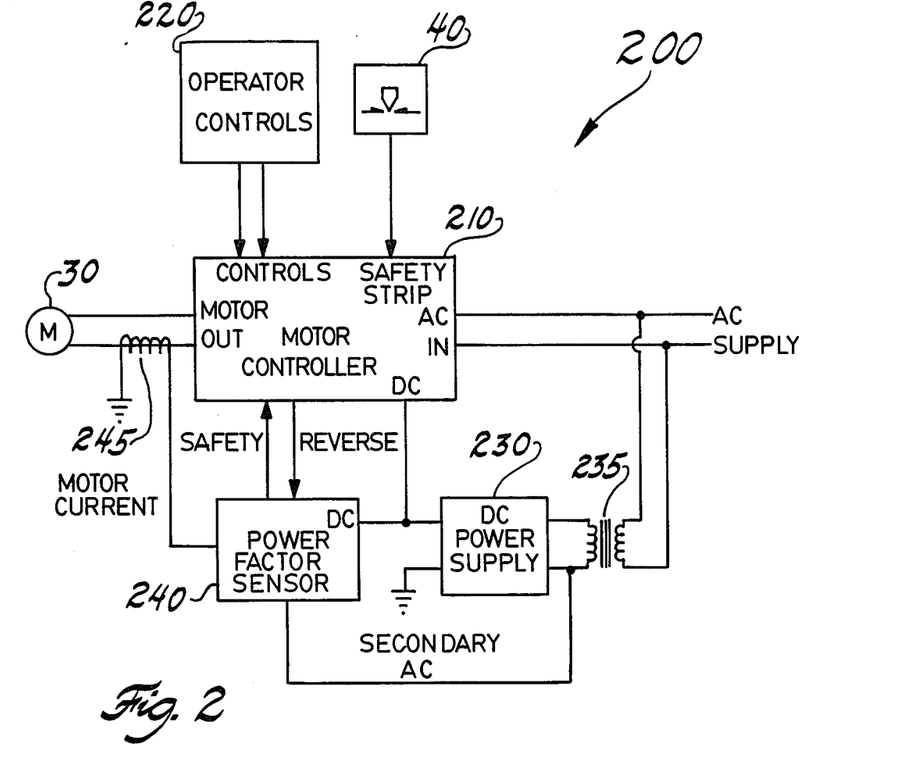
FIG. 2 illustrates in semi-block diagram form the overall motor controller and power factor sensor combination of the present invention.

FIG. 2 illustrates circuit 200 which is the motor controller and safety detector for the motor 30. Circuit 200 includes motor 30 and safety strip 40, previously illustrated in FIG. 1. Circuit 200 further includes motor controller 210, operator controls 220, DC power supply 230 with accompanying transformer 235, and power factor sensor 240.

Motor controller 210 supplies electric power to motor 30 in order to control the operation of gate 20. Motor controller 210 operates under the control of operator controls 220, safety strip 40 and power factor sensor 240. Operator controls 220 includes the usual operator controls for opening and closing the gate 20. The type of such operator controls and their interaction with motor controller 210 are well-known in the art.

Motor controller 210 is also coupled to safety strip 40. Safety strip 40 is illustrated in FIG. 2 as an equivalent momentary contact push-button switch. The momentary operation of safety strip 40 is detected by motor controller 210 which then enters a safety mode of operation. As described above this safety mode may take one of three types. In the first type motor 30 is stopped, perhaps even braked, in order to stop the movement of gate 20. In the second type of safety function, the motor 30 is reversed to drive gate 20 to the limit of travel in the direction opposite to the prior travel of gate 20. This is achieved by reversing the direction of drive of motor 30. A third type of safety operation is the momentary reversal of the movement of the gate 20 followed by a complete stop. This is achieved by momentarily reversing the direction of drive of motor 30 and then stopping motor 30, perhaps also employing braking to enable a faster stop of gate 20. This latter type of control is the most sophisticated and is believed the safest. Firstly, merely stopping the gate may leave it in an unsafe position. On the other hand, completely reversing the gate may present a further hazard because something is caught in the operating parts of the gate. Therefore, momentary reversal and stopping is perhaps the safest operation.

Motor controller 210 receives AC electricity from an AC supply and supplies controllable alternating current to motor 30 for effecting the operation of motor 30. Motor controller 210 also receives a DC input from DC power supply 230. DC power supply 230 is connected to the AC supply via transformer 235. The primary winding of transformer 235 is connected across the AC supply. DC power supply 230 is connected to the secondary of transformer 235. In accordance with a typical system, the AC supply would be the electric power mains having a nominal potential of approximately 120 volts. The secondary of transformer 235 would have a nominal potential of approximately 24 volts. DC power supply 230 supplies rectified and filtered direct current to both motor controller 210 and power factor sensor 240.

Motor controller 210 is also coupled to power factor sensor 240. Motor controller 210 sends a signal to power factor sensor 240 indicating when the direction of travel of motor 30 is reversed. This is employed in a manner which will be described more fully below. Motor controller 210 also receives a safety signal from power factor sensor 240. Power factor sensor 240 generates the safety signal in response to the detection of a power factor in a predetermined range. Motor controller 210 responds to this safety signal in the same manner as it responds to the signal from safety strip 40. That is, motor controller 210 enters a safety mode of operation which might include stopping, reversing or stopping and backing for a predetermined amount the gate 20.

Power factor sensor 240 is employed to measure the power factor of motor 30 and generate a safety signal based upon a predetermined power factor. Power factor sensor 240 receives a signal corresponding to the current flowing through motor 30 via toroidal coil 245. As illustrated schematically in FIG. 2, toroidal coil 245 is wrapped around one of the electrical leads connecting motor controller 210 and motor 30. The alternating current through this lead induces a voltage in toroidal coil 245 which is then applied to power factor sensor 240. Power factor sensor 240 receives a voltage signal from the secondary of transformer 235. This voltage signal has a known phase relationship to the phase of the AC supply and hence to the electric power supplied to motor 30 via motor controller 210. Power factor sensor 240 receives a reverse signal from motor controller 210. This reverse signal indicates operation of motor 30 in reverse. As will be described in more detail below, this signal is used to switch the phase determination of power, factor sensor 240 in accordance with the direction of motion of motor 30. Power factor sensor receives DC power for operation thereof from DC power factor 230. Lastly, power supply sensor 240 generates a safety signal for application to motor controller 210. This safety signal is generated when the power factor measured from the motor current signal from toroidal coil 245 and the secondary AC signal from the secondary of transformer 235 indicates that motor 30 is operating under greater than a predetermined load. The manner of this detection and the generation of this unsafe signal will be more fully described below in conjunction with FIG. 3.

Figure 3:
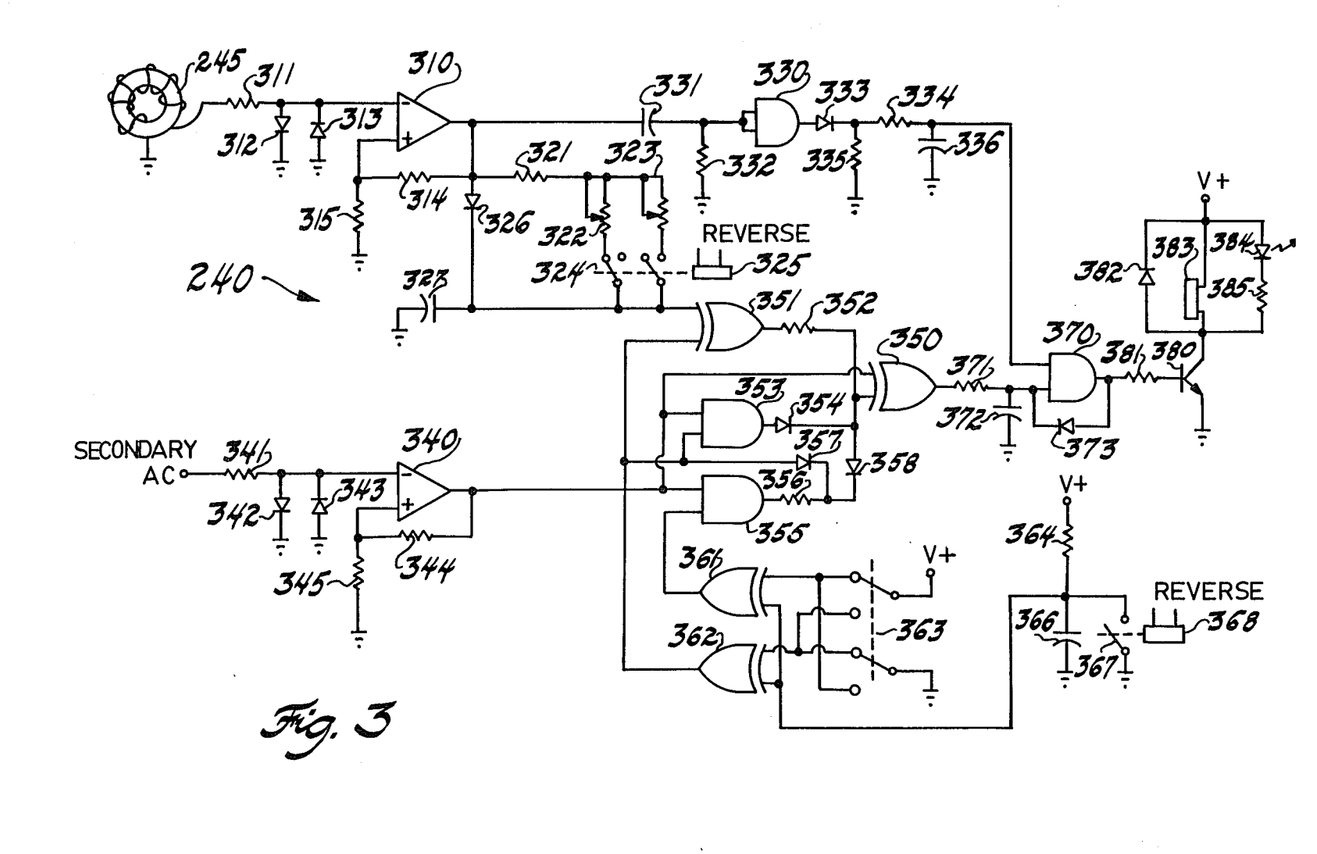
FIG. 3 illustrates in detailed schematic form the power factor sensor of the present invention.

FIG. 3 illustrates in detailed schematic form the circuits employed in the preferred embodiment of the present invention of power factor sensor 240. Power factor sensor 240 consists generally of a pair of signal conditioning units, one receiving the current signal from toroidal coil 245 and one receiving the secondary AC signal from the secondary of transformer 235, a phase comparison unit for comparing the phase of these two signals and a drive unit for activating a relay which provides the safety signal to motor controller 210.

Operational amplifier 310 is the active element in the signal conditioner which is responsive to the signal from toroidal coil 245. This signal is applied to an input network including resistor 311 and a pair of diodes 312 and 313. Diodes 312 and 313 serve to limit the voltage applied to the inverting input of operational amplifier 310, thereby protecting this input. A feedback network including resistor 314 and resistor 315 controls the gain of operational amplifier 310. Generally, the output of operational amplifier 310 is a square wave having the same phase as the generally sinusoidal output of toroidal coil 245. The output of operational amplifier 310 is applied to a delay circuit including diode 326, capacitor 327 and a resistor network including resistor 321 and potentiometers 322 and 323. The switching contacts 324 of relay 325 selects one of these potentiometers 322 and 323 in a manner that will be more fully described below.

This time delay circuit operates as follows: the output of operational amplifier 310 is generally a square wave having the same phase relationship as the current signal sensed by toroidal coil 245. When the output of operational amplifier 310 is positive and above the voltage stored in capacitor 327, diode 326 is forward biased. This causes charge to be stored in capacitor 327 until the voltage across capacitor 327 equals the output voltage of operational amplifier 310. At this point diode 326 becomes back biased and no longer carries a current to charge capacitor 327. Because this is a low impedance path from the output of operational amplifier 310 to capacitor 327, the voltage in capacitor 327 quickly reaches the output voltage of operational amplifier 310, less the forward bias voltage drop across diode 326. When the output of operational amplifier 310 falls below the voltage stored on capacitor 327, diode 326 is back biased and cannot carry any current to discharge capacitor 327. Instead, capacitor 327 is discharged through the selected potentiometer 322 or 323 and the resistor 321. This path is selected to slowly discharge capacitor 327. As a consequence, the voltage applied to the input of exclusive OR gate 351 remains above the triggering voltage for this input for some period after the trailing edge of the pulse output at operational amplifier 310. Therefore, this circuit tends to extend the trailing edge time of the input applied to exclusive OR gate 351. The length of time of this extension can be adjusted by adjusting the setting of the selected potentiometer 322 or 323. By selecting a higher resistance the discharge takes place at a slower rate and the trailing edge of the pulse is extended further.

The AND gate 330 is employed in a circuit to detect whether motor 30 is being supplied with electric power. As noted above, the output of operational amplifier 310 is generally a square wave having the same phase relationship as the current sensed by toroidal coil 345. This output is applied to both inputs of AND gate 330 via a filter circuit comprising capacitor 331 and resistor 332. This filter circuit serves to delay and soften the rise time and fall times of the output from operational amplifier 310. Generally, when operational amplifier 310 generates a positive output AND gate 330 also generates a positive output. This serves to forward bias diode 333 and charge capacitor 336 via resistor 334. When the output of operational amplifier 310 decreases AND gate 330 turns off. This back biases diode 333 and prevents the discharge of capacitor 336 through AND gate 330. Instead, the charge on capacitor 336 is discharged through the resistance path including resistors 334 and 335. The resistance of resistors 334 and 335 have been selected so that this discharge path does not permit the voltage across capacitor 336 to fall below the switching voltage of the input of AND gate 370 during normal operation. That is, during normal operation with a square wave output from operational amplifier 310, though the voltage across capacitor 336 may vary, it generally stays above the threshold voltage of the input of AND gate 370. However, in the event that power is no longer supplied to motor 30, toroidal coil 245 no longer generates an output. Therefore, the output of operational amplifier 310 is zero. This causes AND gate 330 to be turned off. Therefore, the charge in capacitor 336 is no longer renewed during the positive portions of the pulse output from operational amplifier 310. As a consequence, the charge stored in capacitor 336 eventually discharges to the extent that the voltage across capacitor 336 falls below the threshold voltage of the input of AND gate 370. This serves to turn AND gate 370 off and prevent the generation of an output signal. In summary, AND gate 370 is enabled when power is continuously supplied to motor 30, but is disabled when the power stops.

Operational amplifier 340 is connected as a signal conditioning circuit to the secondary of transformer 235. This circuit is generally the same as previously described in conjunction with operational amplifier 330. The secondary AC signal is applied to the inverting input of operational amplifier 340 via resistor 341. Diodes 342 and 343 protect this input from over voltage conditions. A feedback circuit comprising resistors 344 and 345 is employed to set the gain of operational amplifier 340. The output of operational amplifier 340 is generally a square wave having the same phase as the secondary AC signal coming from transformer 235.

The phase comparison between the current and voltage signals occurs in exclusive OR circuit 350. One input of exclusive OR circuit 350 is the output of operational amplifier 340, representing the voltage applied to motor 30. The other input comes from exclusive OR circuit 351 via resistor 352, corresponding to the current supplied to motor 30. A clamp circuit comprising AND gates 353 and 355 generally prevents the leading edge of the current signal from preceding the leading edge of the voltage signal. Ignoring for the moment the effect of the phase circuit including exclusive OR gates 361 and 362, assume that the output of exclusive OR gate 361 is a digital "0" and the output of exclusive OR gate 362 is a digital "1." The digital "1" applied to the second input of exclusive OR gate 351 causes the extended current signal to be provided to exclusive OR gate 350 in the normal sense. AND gate 353 is enabled and AND gate 355 is disabled. When the current signal precedes the voltage signal the output of exclusive OR gate 351 becomes high prior to the output of operational amplifier 340 becoming high. This tends to cause a current to flow between the output of exclusive OR gate 351, via resistor 352, diode 358 and resistor 356 through the output of AND gate 355. Because AND gate 355 is disabled this output serves as a current sink. A second current path occurs from the output of exclusive OR gate 362 through diode 357 and resistor 356 to the current sink at the output of AND gate 355. The relative resistances of resistors 352 and 356 are selected so that the voltage divider circuit formed by these resistors applies a voltage to the input of exclusive OR gate 350 below the switching threshold of exclusive OR gate 350. Therefore, exclusive OR gate 350 is not switched by this output of exclusive OR gate 351. However, when the output of operational amplifier 340 becomes high, this enables AND gate 353. This enables an additional current path from the output of OR gate 353, through diode 354, diode 358, resistor 356 into the current sink of OR gate 355. Because the current through resistor 352 is consequently reduced, the voltage applied to the input of exclusive OR gate 350 is thereby above the switching threshold of exclusive OR gate 350.

The leading edge of the current signal from exclusive OR gate 351 is similarly clamped to the leading edge of the voltage signal to operational amplifier 340 in the case of the opposite phase signal. In this case, exclusive OR gate 361 generates a digital "1" and exclusive OR gate 362 generates a digital "0." As a consequence, AND gate 353 is disabled and AND gate 355 is enabled. Note that the provision of the low signal to one the second input of exclusive OR gate 351 serves to invert the signal from the current signal conditioning circuit including operational amplifier 310. If the output from exclusive OR gate 351 is high, then the current path is established from the output of exclusive OR gate 351, through resistor 352, diode 358 and resistor 356 into the current sink of the output of AND gate 355. Again, because of the magnitudes of resistors 352 and 356, the voltage applied to the input of exclusive OR gate 350 is less than the switching threshold. Thus, exclusive OR gate 350 is not switched. However, when the output from operational amplifier 340 becomes high, AND gate 355 is switched on. This causes the output of AND gate 355 to supply voltage to resistor 356. Consequently, diode 358 is back biased and the voltage applied to the input of exclusive OR gate 350 rises to above the threshold level. The consequence of this circuit is that the exclusive OR circuit 350 does not switch on the leading edge of the current and voltage signals, which are clamped together but only switches on their trailing edges.

A phase signal is applied to this phase comparison circuit from exclusive OR gates 361 and 362. It should be noted that the direction of routing of the line from motor controller 210 to motor 30 determines the phase of the signal sensed by toroidal coil 345. Thus, for example, if the wire were routed in the opposite direction, the phase signal at the output of operational amplifier 310 would be displaced by 180 degrees. Because it would be difficult to specify the particular direction of travel of this wire through the center of toroidal coil 245, another approach has been taken to compensate for this ambiguity in phase. The phase detection circuit including exclusive OR gate 350 is set up to operate properly on one phase. If the phase of the current signal is shifted by 180 degrees, exclusive OR circuit 350 will always generate the safety signal and the automatic portal operator will not operate. One input of exclusive OR gate 362 receives either a signal corresponding to the positive voltage or a ground signal depending upon the position of phase switch 363. In a first position, a high output is applied to the second input of exclusive OR circuit 351 and the current signal is passed unchanged. In the second position, a low input is applied to exclusive OR gate 351 and the current signal is inverted. A second exclusive OR gate 361 is similarly connected in an opposing relationship. As explained above, exclusive OR gate 361 controls the enabling of AND gate 355 which is concerned with the clamping circuit. It is proposed that the combination of motor controller 210 and power factor sensor 240 be tested and the phase switch 363 selected to the position which enables operation of motor 30.

An additional circuit inverts the phase signal output from exclusive OR gates 361 and 362 upon motor reversal. Resistor 364 and capacitor 366 form a circuit which supplies a voltage signal to a second input of each of the exclusive OR gates 361 and 362. Under ordinary conditions the voltage across capacitor 366 is charged to above the voltage threshold level of the inputs of exclusive OR gates 361 and 362. As a consequence, the output of exclusive OR gates 361 and 362 is unchanged. Upon motor reversal, the relay coil 368 is energized via the reverse signal from motor controller 210. This serves to close normally opened relay contacts 367. Closure of normally opened relay contacts 367 discharges the charge on capacitor 366. As a consequence, the signal applied to the second inputs of exclusive OR gates 361 and 362 is below the switching threshold. Therefore, the outputs of these exclusive OR gates are inverted. This circuit serves to correct for phase inversion upon reversal of travel of motor 30 via motor controller 210.

The output circuit of power factor sensor 240 includes AND gate 370. One input of AND gate 370 comes from the operation detection circuit including AND gate 330, which has been previously described. The other input of AND gate 370 comes from the output of exclusive OR gate 350. As explained above, exclusive OR gate 350 generates a signal only when the trailing edges of the current signal and the voltage signal do not match. This output is applied to an RC circuit including resistor 371 and capacitor 372. This RC circuit serves as a glitch filter to absorb small signals from exclusive OR gate 350. A high output from exclusive OR gate 350 begins to charge capacitor 372 through resistor 371. If this high signal is of a relatively short duration, the voltage across capacitor 372 will not reach the threshold voltage at the input of AND gate 370. As a consequence, AND gate 370 will not be triggered. On the other hand, if the output of exclusive OR gate is of sufficient duration, the voltage applied to the input of AND gate 370 will rise above the switching threshold. At this time, a high output is generated at the output of AND gate 370. This output serves two purposes. Firstly, this output forward biases diode 373 and serves to charge capacitor 372 to above the switching threshold. This serves to latch the output of AND gate 370 in order to provide sufficient time for operation of relay coil 383.

The second result of the high output of AND gate 370 is the forward biasing of transistor 380 via resistor 381. This causes transistor 380 to conduct and actuate relay coil 383. Relay coil 383 has contacts (not shown) which ar connected to motor controller 210 to provide the safety signal to motor controller 210. Light emitting diode 384 is also energized through current limiting resistor 385. In accordance with the preferred embodiment, light emitting diode 384 is visible from the exterior of the automatic portal to indicate the generation of this safety signal. Diode 382 is always back biased during normal operation and serves to absorb the voltage spike caused by collapse of the magnetic field when the current through relay coil 383 is switched OFF.

Figure 4:
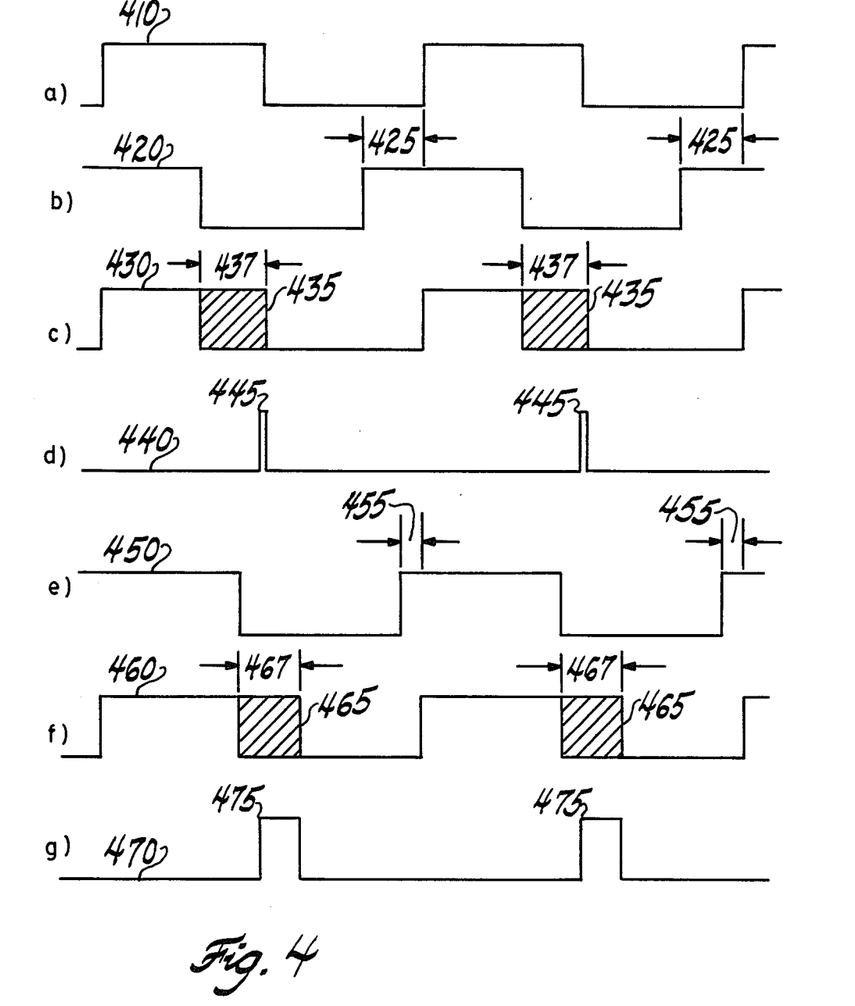
FIG. 4 illustrates waveforms useful in explaining the op of the power factor sensor illustrated in FIG. 3.

FIG. 4 illustrates a plurality of waveforms which will be used to explain the operation of the present invention. FIG. 4a illustrates the voltage signal 410 which is generated at the output of operational amplifier 340. FIG. 4b illustrates current signal 420 which is generated at the output of operational amplifier 310. Notice that current signal 420 has a leading phase in relationship to voltage signal 410 as indicated by 425 in FIG. 4b. FIG. 4c illustrates the waveform 430 which is the current signal input to exclusive OR gate 350. As explained above in relation to the description of FIG. 3, the leading edge of signal 430 is clamped to the leading edge of signal 410. Therefore, this leading edge of signal 430 does not differ from the leading edge of signal 410. FIG. 4c illustrates a portion 435 of the pulse of signal 430 in hash marks. This portion of signal 430 represents the delay introduced by the delay circuit described above. The length 437 of this delay can be altered by changing the set point of the selected potentiometer 322 or 323.

FIG. 4d illustrates signal 440 which is the output of exclusive OR gate 350. Exclusive OR gate 350 generates a signal only when the voltage signal 410 and the current signal 430 differ. Note that at the leading edge of voltage signal 410 no signal is generated because these leading edges are clamped together. In a practical embodiment of the present invention, there may in fact be a slight difference between these leading edges enabling a very short pulse at this time, which will not be of any consequence due to the filter composed of resistor 371 and capacitor 372. Note that at the trailing edge of voltage signal 410 and current signal 430, a short pulse 445 is generated. This short pulse 445 may be generated when the trailing edge of current signal 430 occurs after the trailing edge of voltage signal 410 (as illustrated herein) or may also occur when the trailing edge of current signal 430 precedes the trailing edge of current signal 410. The essential feature is that the set point of the selected potentiometer 322 or 323 is selected so that length of time 437 of the delay causes the trailing edge of current signal 430 to be near the trailing edge of voltage signal 410. Because this pulse 445 is so short, there is insufficient time for capacitor 372 to be charged to the threshold voltage of the input of AND gate 370. As a consequence, no safety signal is generated by power factor sensor 240.

FIG. 4e illustrates a second current signal 450 having a smaller phase difference 455 from that of voltage signal 410. Such a smaller phase difference indicates operation in a more resistive mode, and consequently indicates the presence of a greater load on the motor 30.

FIG. 4f illustrates the equivalent signal 460 applied to the input of exclusive OR gate 350. This signal also includes portion 465 corresponding to the delay caused by the delay circuit attached to operational amplifier 310. The interval 467 of this delay is equal to the interval 437 of the previously illustrated delay in FIG. 4c, because this potentiometer has not been adjusted.

FIG. 4g illustrates output 470 from exclusive OR gate 350. Notice that because of the decrease of the amount of leading phase of the current signal in regard to the voltage signal, a much longer pulse 475 is generated at the output of exclusive OR gate 350. Also note, as previously illustrated in FIG. 4d, no output is generated at the leading edge of voltage signal 410. Because of this increase in the length of the output pulse to the size 475 illustrated in FIG. 4g, sufficient charge is accumulated on capacitor 372 to cause AND gate 370 to be enabled. As a consequence, relay coil 383 is energized and the safety signal is communicated to motor controller 210.

Upon setting up portal control system 200 for operation, the set point of potentiometers 322 and 323 are adjusted to provide the desired control. FIG. 3 illustrates relay coil 325 which is energized from the reverse signal from motor controller 310. Relay contacts 324 selects one of the potentiometers 322 or 323. This provision of the time delay circuit enables the selection of a differing potentiometer setting for forward and reverse operations of the portal operator. Thus, for example, a differing time delay can be set for forward and reverse operations and therefore a differing predetermined power factor threshold can be set for generation of the safety signal.

I claim:

1. An automatic portal operator comprising:
    a portal closing member movable between a closed position blocking a portal and an open position not blocking said portal;
    an induction motor mechanically coupled to said portal closing member for controllably moving said portal closing member between said closed position and said open position;
    a motor controller electrically coupled to said induction motor for supplying electrical power to said induction motor for controllably moving said portal closing member toward said closing position or toward said open position, said motor controller including a safety operation for supplying electric power to said induction motor to render said portal closing member safe; and
    a power factor sensor connected to said induction motor and said motor controller including
        a current sensor for generating a current square wave signal having the phase of the current supplied to said induction motor by said motor controller,
        a pulse stretching circuits connected to said current sensor for generating a extended current square wave signal having a trailing edge a predetermined length of time after the trailing edge of said current square wave signal,
        a voltage sensor for generating a voltage square wave signal having the phase of the voltage supplied to said induction motor by said motor controller,
        a clamping circuit connected to said pulse stretching circuit and said voltage sensor for clamping the reading edge of said extended current square wave signal to the leading edge of said voltage square wave signal, thereby producing a clamped extended current square wave signal, an inclusive or circuit connected to said voltage sensor and said clamping circuit for generating a phase output signal when said clamped extended current square wave signal differs from said voltage square wave signal, and an output circuit connected to said motor controller and said exclusive OR circuit for triggering said motor controller to execute said safety operation if the duty cycle of said phase output signal exceeds a predetermined amount.

2. The automatic portal operator as claimed in claim 1, wherein:
said safety function of said motor controller includes supplying electrical power to said induction motor to stop the motion of said portal closing member.

3. The automatic portal operator as claimed in claim 1, wherein:
said safety function of said motor controller includes supplying electrical power to said induction motor to reverse the motion of said portion closing member.

4. The automatic portal operator as claimed in claim 1, wherein:
said safety function of said motor controller includes supplying electrical power to said induction motor to reverse the motor of said portal closing member for a predetermined amount and then to stop the motion of said portal closing member.

5. The automatic portal operator as claimed in claim 1, wherein:
said current sensor includes a toroidal coil having an opening through which is passed one wire supplying electric power to said induction motor; and
said power factor sensor includes a manually operable phase reversal means for reversing the phase of a selected one of said current sensor or said voltage sensor, whereby passage of said one wire through said opening in said toroidal coil in either direction may be accommodated by operation of said phase reversal means.

6. The automatic portal operator as claimed in claim 1, wherein:
said motor controller includes means for generating a reversal signal upon supplying electrical power to said induction motor for moving said portal closing member toward a selected one of said closed position or said open position; and
said power factor sensor includes a phase reversal means coupled to receive said reversal signal for reversing the phase of a selected one of said current sensor or said voltage sensor upon receipt of said reversal signal.

7. The automatic portal operator as claimed in claim 1, wherein:
said motor controller includes means for generating a reversal signal upon supplying electrical power to said induction motor for moving said portal closing member toward a selected one of said closed position or said open position; and
said power factor sensor is further coupled to said motor controller to receive said reversal signal and includes means for triggering said motor controller to execute said safety operation if said power factor of the electrical power supplied to said induction motor indicates the load on said induction motor exceeds a first predetermined amount when said reversal signal is not received and if said power factor of the electrical power supplied to said induction motor indicates the load on said induction motor exceeds a second predetermined amount different from said first predetermined amount when said reversal signal is received.

8. The automatic portal operator as claimed in claim 1, further comprising:
a motor power detection circuit connected to said current sensor and said output circuit for inhibiting said output circuit from triggering said motor controller to execute said safety operation if no current is supplied to said induction motor via said motor controller for more than a predetermined period of time.

9. An automatic portal operator comprising:
a portal closing member movable between a closed position blocking a portal and an open position not blocking said portal;
an induction motor mechanically coupled to said portal closing member for controllably moving said portal closing member between said closed position and said open position;
a motor controller electrically coupled to said induction motor for supplying electrical power to said induction motor for controllably moving said portal closing member toward said closing position or toward said open position, said motor controller including a safety operation for at least stopping said induction motor to render said portal closing member safe; and
a power factor sensor connected to said induction motor and said motor controller including
a current sensor for generating a current phase signal indicative of the phase of the current supplied to said induction motor by said motor controller, said current sensor including a toroidal coil having an opening through which is passed one wire supplying current to said induction motor,
a voltage sensor for generating a voltage phase signal indicative of the phase of the voltage supplied to said induction motor by said motor controller,
a manually operable phase reversal means connected a predetermined one of said current sensor or said voltage sensor to selectively invert said phase signal of said predetermined sensor, whereby passage of said one wire through said opening in said toroidal coil in either direction may be accommodated by operation of said phase reversal switch, and
a phase comparator circuit connected to said current sensor, said voltage sensor and said motor controller for triggering said motor controller to execute said safety operation if the difference in phase between said current phase signal and said voltage phase signal is less than a predetermined amount.

10. An automatic portal operator comprising:
a portal closing member movable between a closed position blocking a portal and an open position not blocking said portal;
an induction motor mechanically coupled to said portal closing member for controllably moving said portal closing member between said closed position and said open position;
a motor controller electrically coupled to said induction motor for supplying electrical power to said induction motor for controllably moving said portal closing member toward said closing position or toward said open position, said motor controller including a safety operation for at least stopping said induction motor to render said portal closing member safe, and said motor controller further including a means for generating a reversal signal when said portal closing member is moved toward a first of said closed position and said open position and not generating said reversal signal when said portal closing member is moved toward the other of said closed position and said open position; and a power factor sensor connected to said induction motor and said motor controller for triggering said motor controller to execute said safety operation if the power factor of the electrical power supplied to said induction motor indicates the load on said induction motor exceeds a predetermined amount; and means connected to said motor controller and said power factor sensor for setting said predetermined amount of load as a first predetermined amount if said reversal signal is received and as a second predetermined amount if said reversal signal is not received.

11. The automatic portal operator as claimed in claim 9, wherein:

said power factor sensor includes
- a current sensor for generating a current phase signal indicative of the phase of the current supplied to said induction motor by said motor controller,
- a voltage sensor for generating a voltage phase signal indicative of the phase of the voltage supplied to said induction motor by said motor controller, a phase reversal means connected to a predetermined one of said current sensor or said voltage sensor to invert said phase signal of said predetermined sensor upon receipt of said reversal signal, and a phase comparator circuit connected to said current sensor, said voltage sensor and said motor controller for triggering said motor controller to execute said safety operation if the difference in phase between said current phase signal and said voltage phase signal is less than a predetermined amount.

* * * * *